Nov. 7, 1950

J. L. BAZELON 2,529,368

CELLARET HAVING COMBINED MUSICAL
DEVICE AND ROTATABLE RACK

Filed July 22, 1946

Inventor:
Jacob L. Bazelon,
By Dawson, Booth, Spangenberg,
Attorneys.

Nov. 7, 1950
J. L. BAZELON
2,529,368
CELLARET HAVING COMBINED MUSICAL
DEVICE AND ROTATABLE RACK
Filed July 22, 1946
3 Sheets-Sheet 3
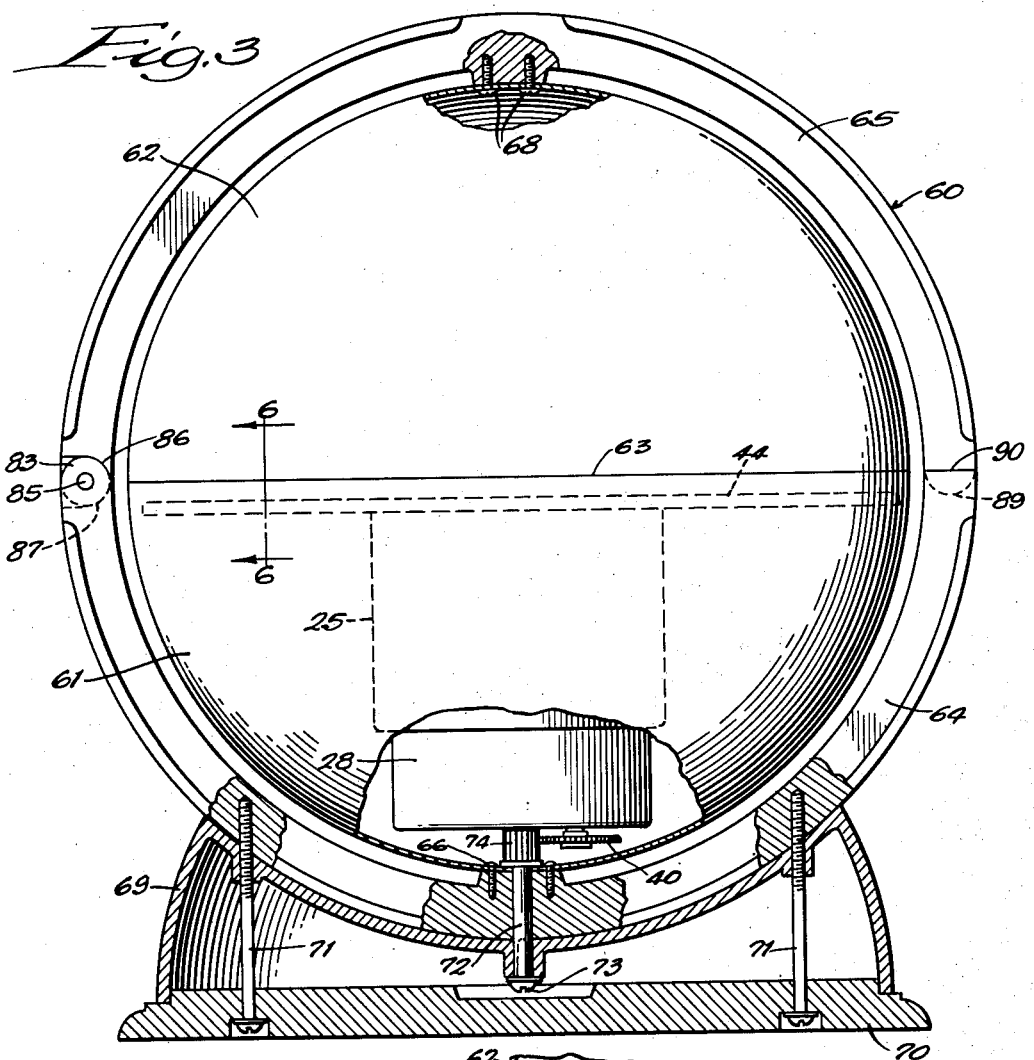
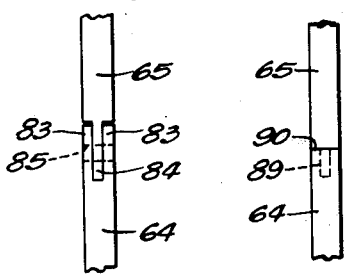
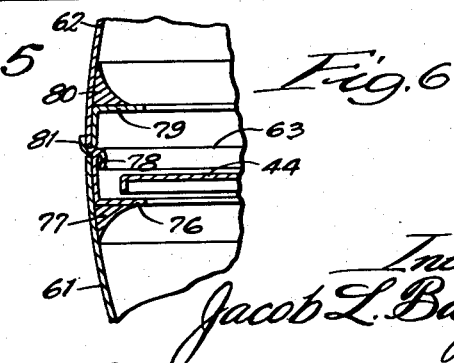

Patented Nov. 7, 1950

2,529,368

UNITED STATES PATENT OFFICE 2,529,368

CELLARET HAVING COMBINED MUSICAL DEVICE AND ROTATABLE RACK

Jacob L. Bazelon, Chicago, Ill.

Application July 22, 1946, Serial No. 685,569

12 Claims. (Cl. 312—183)

This invention relates to cellarets containing dispensing bottles and glasses.

The principal object of this invention is to provide an improved cellaret of that type wherein a novel casing is employed, wherein the glasses are supported in an annular rack located within the casing, wherein the rack is formed on a cup shaped member rotatably mounted in the casing, wherein the cup shaped member and rack are slowly rotated by a motor and wherein the motor is controlled by a dispensing bottle adapted to be received in the cup shaped member. The motor may be a spring operated musical device for providing music when the cup shaped member and rack are being slowly rotated thereby. While the casing may be formed in various configurations, it is preferably spherical in form and may be representative of a bowling ball or a globe of the world or the like.

Further objects of this invention reside in the details of construction of and the cooperation between the various component parts of the improved cellaret.

Other objects and advantages will become apparent to those skilled in the art upon reference to the accompanying specification, claims and drawing, in which—

Fig. 3 is a side elevational view partly in section of another form of rotating cellaret;

Fig. 4 is a partial side elevational view of a portion of the meridian ring;

Fig. 5 is a partial side elevational view of another portion of the meridian ring; and Fig. 6 is an enlarged sectional view taken substantially along the line 6 of Fig. 3.

Figure 1:
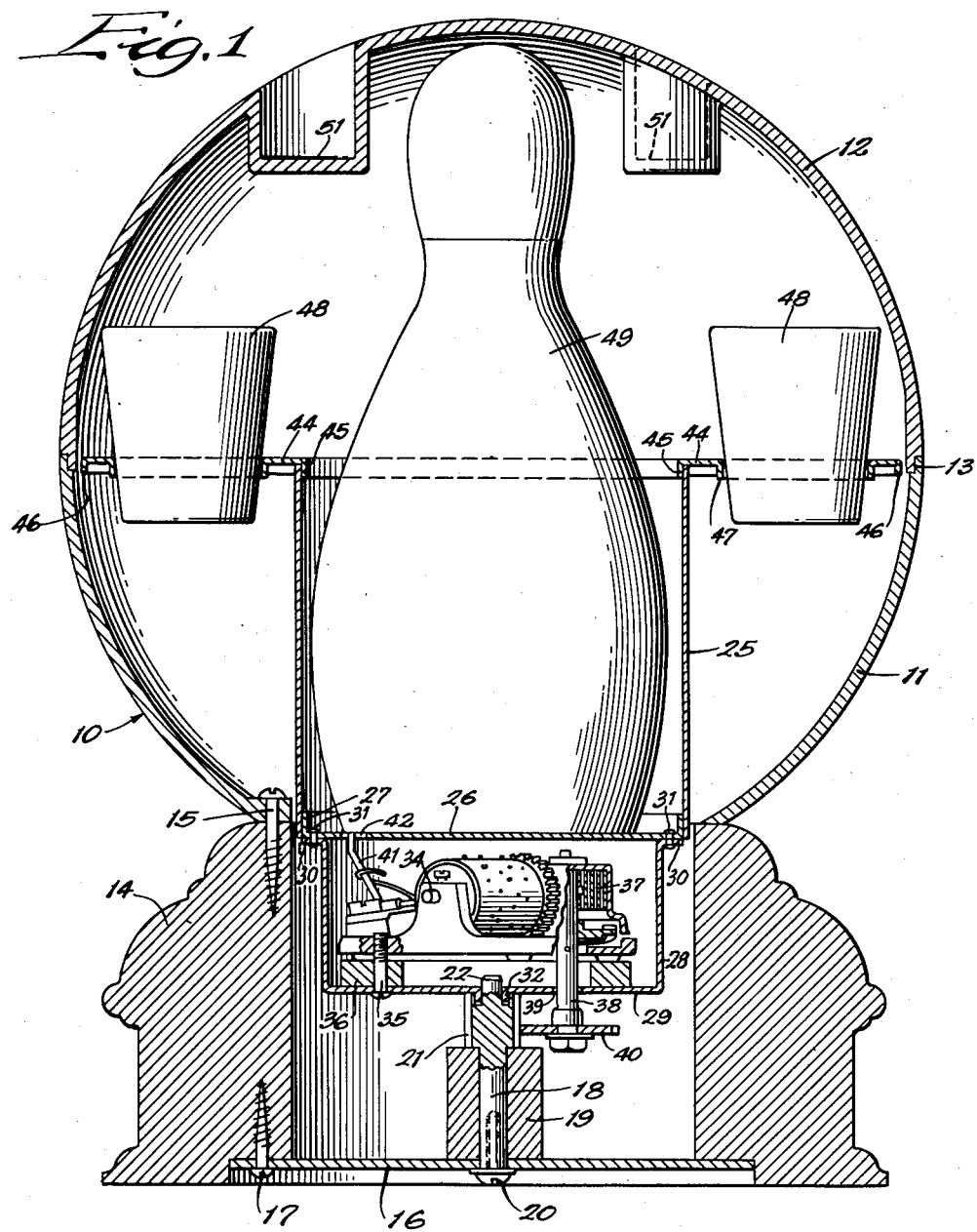
Figure 1 is a vertical sectional view through one form of the rotating cellaret.
Figure 2:
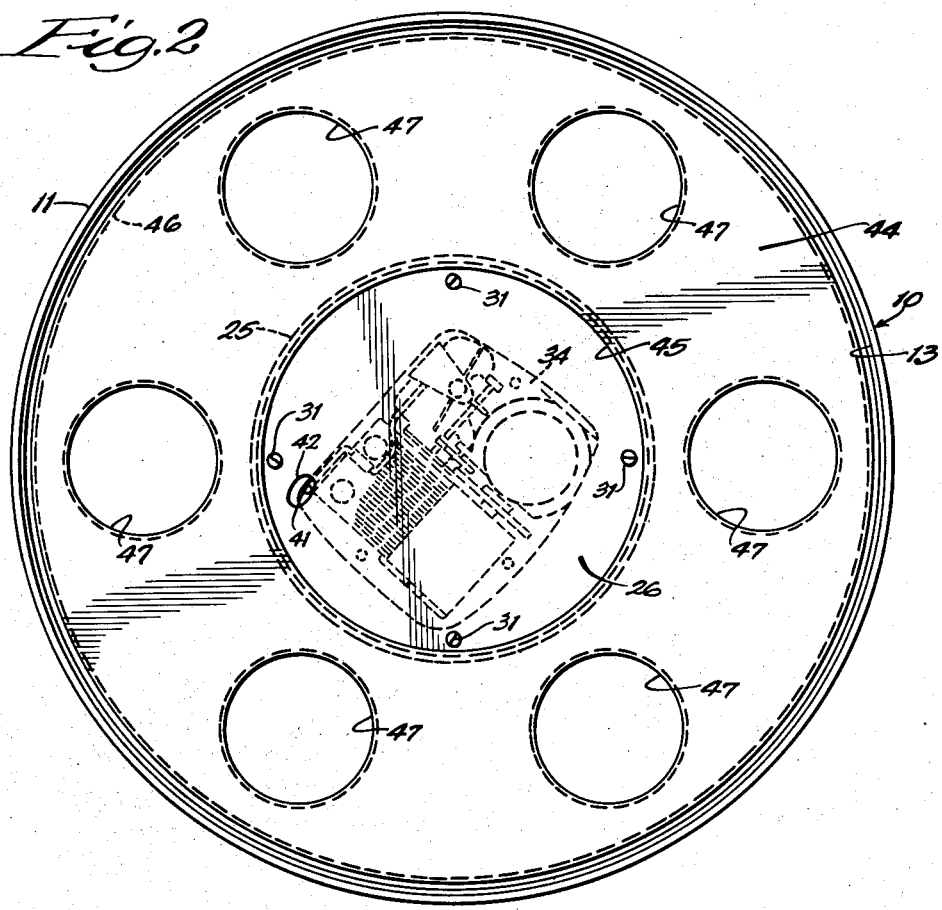
Fig. 2 is a plan view of the rotating cellaret with the cover thereof removed.

Referring first to Figs. 1 and 2, the rotating cellaret includes a casing generally designated at 10. As shown, the casing is made in spherical form and has lower and upper component semi-spherical parts 11 and 12, respectively. Rabbets 13 at the juncture of the component parts maintain the two parts in assembled relation but permit removal of part 12 from part 11. The component parts 11 and 12 may be suitably molded from plastic.

The lower component part 11 is suitably secured to a base 14 by means of screws 15 and the base 14 may be formed of wood or any other suitable material. The base 14 is preferably provided with an opening therethrough and the bottom end of this opening may be closed by a bottom plate 16 secured to the base by screws 17. Stud 18, having an enlarged head and carried in a sleeve 19, is clamped to the base plate 16 by means of a screw 20 screw threadedly received in the stud 18. The enlarged head of the stud 18 is provided with gear teeth 21 and is also provided with an extension 22.

A cup shaped member, including parts 25 and 28, is rotatably mounted on the stud 18. The part 25 may be in the form of a sleeve and the bottom end thereof may be closed by a plate 26 having a flange 27, the flange 27 being suitably secured to the sleeve 25 as by welding. The part 28 may comprise a cup having a bottom 29 and a flange 30. The flange 30 may be secured to the plate 26 by means of screws or rivets 31. The bottom 29 of the cup 28 is punched downwardly to form a flange 32 and the flange 32 may be reamed to receive the extension 22 of the stud 18. In this way, the cup shaped member, including the parts 25 and 28, are fabricated and rotatably mounted on the stud 18.

Mounted within the cup 28 is a spring motor 34 which in accordance with this invention may take the form of a spring operated musical device of conventional form. The spring operated musical device 34 may be secured to the cup 28 by screws 35 and may be properly located within the cup 28 by a spacing ring 36. The musical device includes a spring 37 associated with a winding arbor 38 and in accordance with this invention, the winding arbor 38 is provided with a gear 40 meshing with the gear teeth 21 on the stationary stud 18. The musical device 34 may also be provided with a release member 41 extending through opening 42 in the plate 26.

When the release member 41 is released, the musical device 34 operates to provide music and during the operation thereof, the winding arbor 38 is rotated by the spring 37. Since the winding arbor 38 is connected through gear 40 to the gear teeth 21 on the stud 18, the arbor 38 in rotating about its own axis causes the cup shaped member formed of the parts 25 and 28 to rotate about the axis of the stationary stud 18, the cup shaped member being supported for rotation by the extension 22 on the stud 18. Minor inaccuracies in the alignment of the winding arbor 38 are of no substantial importance inasmuch as the rotating effort thereof is imparted through the gear 40 and gear teeth 21, proper vertical mounting for the rotating cup shaped member being afforded by the extension 22 on the stationary stud 18. When the release member 41 is depressed as by the weight of a bottle in the cup shaped member, the operation of the musical device is stopped and hence rotation of the cup shaped member is also stopped.

An annular rack 44 is formed on the upper end of the cup shaped member 25. In this respect, the rack 44 is provided with a flange 45 suitably secured to the sleeve 25 as by welding. The rack 44 is also provided with an external flange 46 for adding rigidity thereto. The rack is provided with a plurality of flanged openings 47 for receiving a plurality of glasses 48. A bottle 49, which may take the form of a bowling pin, is received within the sleeve 25 of the cup shaped member and when the bottle 49 is in place therein, the musical device is inoperative. However, when the bottle 49 is removed, the musical device becomes operative in the manner pointed out above providing music and causing rotation of the cup shaped member and the rack 44. The spring 37 of the musical device may be wound by manually rotating the rack 44.

To facilitate removing the upper component part 12 of the casing 10 and to cause the spherical casing 10 to represent a bowling ball, for example, it is provided with finger recesses 51.

The rotating cellaret shown in Fig. 3 is of somewhat different form from that illustrated in Fig. 1, and is preferably designed to represent a globe of the world rather than a bowling ball. In this connection, the casing in Fig. 3 is generally designated at 60 and is spherical in form, having lower and upper component semi-spherical parts 61 and 62 of a conventional globe of the world. The juncture between the component parts thereof is shown at 63. Associated with the globe is a ring formed of lower and upper halves 64 and 65, respectively. The lower half 61 of the globe is secured to a boss on the lower half of the ring 64 by screws 66, and in a like manner, the upper half 62 of the globe is connected to a boss on the upper half 65 of the ring by means of screws 68. The lower half 64 of the ring is carried by a support 69 which in turn is carried by a base 70. Screws 71 extending through the base 70, the support 69 and the lower half 64 of the ring clamp these parts together. A stationary stud 72, having an enlarged head, extends through the lower half 61 of the globe, the lower half 64 of the ring and the support 69 and is clamped thereto by means of a screw 73, screw threadedly received in the stationary stud 72. The stud 72 is also provided with gear teeth 74 meshing with the pinion 40 operated by the winding arbor of the musical device enclosed within the cup shaped member 25, 28. The operation of the musical device in producing music and rotating the cup shaped member and the rack 44 in Fig. 3 is the same as that in Fig. 1 and, therefore, a further description thereof is not considered necessary. The rack 44 lies adjacent to the juncture 63 of the two halves of the globe.

The globe casing 60, being of conventional construction, is made of light-weight sheet metal with a map of the world secured thereon, but since the globe of this invention is utilized in two half sections, provision must be made for adding rigidity thereto. In this connection, the lower half 61 of the globe is provided with a flanged hoop 76 suitably secured to the inside of the globe by adhesive designated at 77 and the edge of the flanged hoop 76 is preferably curled inwardly as at 78. In a like manner, the upper half 62 of the globe is provided with a flanged hoop 79 secured thereto by adhesive 80. Here, however, the flange of the flanged hoop 79 is curled outwardly as at 81. The two flanged hoops 76 and 79 thereby add rigidity to the globe and also provide a self-aligning juncture between the two halves of the globe.

The lower half 64 of the ring is bifurcated at one end as designated at 83 and these bifurcated ends are rounded as illustrated in Fig. 3. The upper half 65 of the ring is provided with a rounded tongue 84 which fits between the bifurcations 83 and the two halves of the ring are pivotally connected together by a pin 85. The rounded portions of the bifurcations and the tongue provide the main support between the two halves of the ring, the parts being held in assembled relation by the pin 85. Because of this supporting action and because of the bifurcation and tongue arrangement, lateral displacement of the top half 65 of the ring with respect to the bottom half 64 is largely eliminated. The other end of the bottom half 64 of the ring is provided with an arcuate slot for receiving a tongue 89 carried by the upper half 65 of the ring, the juncture between the two halves being made at 90. This tongue and slot arrangement prevents lateral displacement of the ring parts with respect to each other when the globe is closed. When the globe is pivotally opened about the pivot pin 85, lateral displacement of the top halves of the ring and globe is prevented by the particular hinge joint. The flanged hoops provide rigidity for the globe, especially when it is swung into the open position to provide access to the interior thereof.

While for purposes of illustration two forms of this invention have been disclosed, other forms thereof may become apparent to those skilled in the art upon reference to this disclosure and, therefore, this invention is to be limited only by the scope of the appended claims and prior art.

I claim as my invention:

1. A rotating cellaret comprising, a casing, a cup shaped member rotatably mounted in the casing, an annular horizontally disposed rack formed at the top of the cup shaped member and adapted to carry glasses within the casing, a spring motor carried at the bottom of the cup shaped member for rotating the same, a supporting member for a bottle in the cup shaped member and a release member for the motor extending through an opening in the supporting member to be engaged by a bottle received in the cup shaped member for controlling the operation of the motor.

2. A rotating musical cellaret comprising, a casing, a cup shaped member rotatably mounted in the casing, an annular horizontally disposed rack formed at the top of the cup shaped member and adapted to carry glasses within the casing, a spring operated musical device carried at the bottom of the cup shaped member for rotating the same, a supporting member for a bottle in the cup shaped member and a release member for the musical device extending through an opening in the supporting member to be engaged by a bottle received in the cup shaped member for controlling the operation of the musical device.

3. A rotating cellaret comprising, a casing, a vertical stud in the casing, a cup shaped member rotatably mounted on the stud, an annular horizontally disposed rack formed at the top of the cup shaped member and adapted to carry glasses within the casing, a spring operated motor carried at the bottom of the cup shaped member for rotating the same, a supporting member for a bottle in the cup shaped member and a release member for the motor extending through an opening in the supporting member to be engaged by a bottle received in the cup shaped member for controlling the operation of the motor.

4. A rotating musical cellaret comprising, a casing, a vertical stud in the casing, a cup shaped member rotatably mounted on the stud, an annular horizontally disposed rack formed at the top of the cup shaped member and adapted to carry glasses within the casing, a spring operated musical device carried at the bottom of the cup shaped member for rotating the same, a supporting member for a bottle in the cup shaped member and a release member for the musical device extending through an opening in the supporting member to be engaged by a bottle received in the cup shaped member for controlling the operation of the musical device.

5. A rotating cellaret comprising, a casing, a vertical stud in the casing provided with gear teeth, a cup shaped member rotatably mounted on the stud, an annular horizontally disposed rack formed at the top of the cup shaped member and adapted to carry glasses within the casing, a spring operated motor having a driven shaft carried at the bottom of the cup shaped member, a gear carried by the driven shaft and meshing with the gear teeth of the stud for rotating the cup shaped member.

6. A rotating cellaret comprising, a casing, a vertical stud in the casing provided with gear teeth, a cup shaped member rotatably mounted on the stud, an annular horizontally disposed rack formed at the top of the cup shaped member and adapted to carry glasses within the casing, a spring operated motor having a driven shaft carried at the bottom of the cup shaped member, a gear carried by the driven shaft and meshing with the gear teeth of the stud for rotating the cup shaped member, a supporting member for a bottle in the cup shaped member and a release member for the motor extending through an opening in the supporting member to be engaged by a bottle received in the cup shaped member for controlling the operation of the motor.

7. A rotating musical cellaret comprising, a casing, a vertical stud in the casing provided with gear teeth, a cup shaped member rotatably mounted on the stud, an annular horizontally disposed rack formed at the top of the cup shaped member and adapted to carry glasses within the casing, a spring operated musical device having a winding arbor carried at the bottom of the cup shaped member, a gear carried by the winding arbor and meshing with the gear teeth of the stud for rotating the cup shaped member.

8. A rotating musical cellaret comprising, a casing, a vertical stud in the casing provided with gear teeth, a cup shaped member rotatably mounted on the stud, an annular horizontally disposed rack formed at the top of the cup shaped member and adapted to carry glasses within the casing, a spring operated musical device having a winding arbor carried at the bottom of the cup shaped member, a gear carried by the winding arbor and meshing with the gear teeth of the stud for rotating the cup shaped member, a supporting member for a bottle in the cup shaped member and a release member for the musical device extending through an opening in the supporting member to be engaged by a bottle received in the cup shaped member for controlling the operation of the musical device.

9. A rotary cellaret comprising, a spherical casing formed of upper and lower component semi-spherical parts, a cup shaped member rotatably mounted in the lower component semi-spherical part of the casing, an annular horizontally disposed rack formed at the top of the cup shaped member in substantial alignment with the juncture of the component semi-spherical parts of the casing and adapted to carry glasses within the casing, and a motor for rotating the cup shaped member and tray.

10. A rotary musical cellaret comprising, a spherical casing formed of upper and lower component semi-spherical parts, a cup shaped member rotatably mounted in the lower component semi-spherical part of the casing, an annular horizontally disposed rack formed at the top of the cup shaped member in substantial alignment with the juncture of the component semi-spherical parts of the casing and adapted to carry glasses within the casing, and a spring operated musical device for rotating the cup shaped member and tray.

11. A rotary musical cellaret comprising, a spherical casing formed of upper and lower component semi-spherical parts, a cup shaped member rotatably mounted in the lower component semi-spherical part of the casing, an annular horizontally disposed rack formed at the top of the cup shaped member in substantial alignment with the juncture of the component semi-spherical parts of the casing and adapted to carry glasses within the casing, a spring operated musical device for rotating the cup shaped member and tray, a supporting member for a bottle in the cup shaped member and a release member for the musical device extending through an opening in the supporting member to be engaged by a bottle received in the cup shaped member for controlling the operation of the musical device.

12. A rotary cellaret comprising, a spherical casing formed of upper and lower component semi-spherical parts, a cup shaped member rotatably mounted in the lower component semi-spherical part of the casing, an annular horizontally disposed rack formed at the top of the cup shaped member in substantial alignment with the juncture of the component semi-spherical parts of the casing and adapted to carry glasses within the casing, a motor for rotating the cup shaped member and tray, a ring formed in two halves and having junctures in alignment with the junctures of the two component semi-spherical parts of the casing and each connected to a component part, a hinge for one of the junctures of the ring, and a tongue and groove joint for the other juncture.

JACOB L. BAZELON.

REFERENCES CITED

The following references are of record in the file of this patent:

UNITED STATES PATENTS

| Number | Name | Date |
| --- | --- | --- |
| 653,348 | Hertel | July 10, 1900 |
| 1,734,770 | Kayan | Nov. 5, 1929 |

FOREIGN PATENTS

| Number | Country | Date |
| --- | --- | --- |
| 128,424 | Switzerland | Dec. 1, 1928 |